United States Patent
Burdick et al.

(10) Patent No.: US 9,803,559 B2
(45) Date of Patent: Oct. 31, 2017

(54) VARIABLE VANE AND SEAL ARRANGEMENT

(71) Applicant: UNITED TECHNOLOGIES CORPORATION, Hartford, CT (US)

(72) Inventors: Andrew D. Burdick, Somers, CT (US); Thomas J. Praisner, Colchester, CT (US); Andrew S. Aggarwala, Vernon, CT (US); Eric A. Hudson, Harwinton, CT (US); Michael G. McCaffrey, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 425 days.

(21) Appl. No.: 14/615,665

(22) Filed: Feb. 6, 2015

(65) Prior Publication Data

US 2015/0285157 A1 Oct. 8, 2015

Related U.S. Application Data

(60) Provisional application No. 61/936,605, filed on Feb. 6, 2014.

(51) Int. Cl.
*F02C 3/04* (2006.01)
*F02C 9/20* (2006.01)
*F01D 5/14* (2006.01)
*F01D 11/02* (2006.01)
(Continued)

(52) U.S. Cl.
CPC ............... *F02C 9/20* (2013.01); *F01D 5/148* (2013.01); *F01D 11/025* (2013.01); *F01D 17/162* (2013.01); *F02C 3/04* (2013.01); *F01D 9/02* (2013.01); *F05D 2240/122* (2013.01);
(Continued)

(58) Field of Classification Search
USPC .... 415/148, 151, 159, 160, 161, 162, 170.1, 415/174.2, 230, 231; 277/630, 637, 641, 277/642, 645, 651, 652; 60/226.1, 226.3, 60/228, 230, 232, 770, 771, 796, 797, 60/805, 806
See application file for complete search history.

(56) References Cited

U.S. PATENT DOCUMENTS 2,910,209 A * 10/1959 Nelson ................... A61G 17/02
  220/378
3,442,493 A    5/1969 Smith, Jr.
(Continued)

FOREIGN PATENT DOCUMENTS

DE    10352789 A1    6/2005
EP    0633392 A1    1/1995
(Continued)

OTHER PUBLICATIONS

European Search Report for European Patent Application No. 15153285.0 dated Aug. 14, 2015.

*Primary Examiner* — Binh Q Tran
(74) *Attorney, Agent, or Firm* — Carlson, Gaskey & Olds, P.C.

(57) ABSTRACT

One exemplary embodiment of this disclosure relates to a system including an airfoil having a static portion, a moveable portion, and a seal between the static portion and the moveable portion. The seal is moveable separate from the static portion and the moveable portion.

18 Claims, 5 Drawing Sheets

(51) Int. Cl.
*F01D 17/16* (2006.01)
*F01D 9/02* (2006.01)

(52) U.S. Cl.
CPC ............ *Y02T 50/672* (2013.01); *Y02T 50/673* (2013.01); *Y10T 137/0536* (2015.04)

(56) References Cited

U.S. PATENT DOCUMENTS

| | | | | |
|---|---|---|---|---|
| 3,990,810 | A | * | 11/1976 | Amos ................... F01D 17/162 |
| | | | | 415/161 |
| 4,097,187 | A | * | 6/1978 | Korta ................... F01D 17/162 |
| | | | | 415/161 |
| 4,705,452 | A | | 11/1987 | Karadimas |
| 4,897,020 | A | | 1/1990 | Tonks |
| 5,472,314 | A | * | 12/1995 | Delonge ................ F01D 5/148 |
| | | | | 415/115 |
| 5,941,537 | A | * | 8/1999 | Wallace ................ F01D 5/148 |
| | | | | 277/628 |
| 6,045,325 | A | * | 4/2000 | Horvath ................ F01D 5/148 |
| | | | | 277/637 |
| 7,055,304 | B2 | | 6/2006 | Courtot et al. |
| 7,942,632 | B2 | | 5/2011 | Lord et al. |
| 9,249,736 | B2 | * | 2/2016 | Carroll ................... F01D 5/146 |
| 2012/0163960 | A1 | | 6/2012 | Ress, Jr. et al. |
| 2013/0031913 | A1 | * | 2/2013 | Little ................... F01D 17/162 |
| | | | | 60/796 |

FOREIGN PATENT DOCUMENTS

| | | | |
|---|---|---|---|
| EP | 0924389 | A2 | 6/1999 |
| EP | 2388436 | A2 | 11/2011 |
| GB | 774501 | A | 5/1957 |

\* cited by examiner

VARIABLE VANE AND SEAL ARRANGEMENT

STATEMENT REGARDING GOVERNMENT SUPPORT

This invention was made with government support under Contract No. N00014-09-D-0821-0006 awarded by the United States Navy. The government has certain rights in this invention.

BACKGROUND

Gas turbine engines typically include a compressor section, a combustor section, and a turbine section. During operation, air is pressurized in the compressor section, and is mixed with fuel and burned in the combustor section to generate hot combustion gases. The hot combustion gases are communicated through the turbine section, which extracts energy from the hot combustion gases to power the compressor section and other gas turbine engine loads.

Typically, both the compressor and turbine sections include alternating arrays of vanes and rotating blades that extend into a core airflow path of the gas turbine engine. For example, in the turbine section, turbine blades rotate and extract energy from the hot combustion gases. The turbine vanes guide the airflow and prepare it for a downstream array of blades. Some engines include variable area turbine sections, which include vanes that are moveable to vary the area of the core airflow path. Movement of the vanes is controlled to optimize the performance of the engine during various operating conditions.

SUMMARY

One exemplary embodiment of this disclosure relates to a system including an airfoil having a static portion, a moveable portion, and a seal between the static portion and the moveable portion. The seal is moveable separate from the static portion and the moveable portion.

In a further embodiment of any of the above, the seal is retained against the moveable portion.

In a further embodiment of any of the above, the seal is retained against moveable portion at least partially by a fluid.

In a further embodiment of any of the above, the seal is resiliently retained against the moveable portion at least partially by a spring.

In a further embodiment of any of the above, the static portion includes a seat, the seal partially received in the seat.

In a further embodiment of any of the above, the seal includes a fore surface and an aft surface, the aft surface being convex.

In a further embodiment of any of the above, the aft surface abuts a leading surface of the moveable portion, the leading surface being convex.

In a further embodiment of any of the above, the seal includes a fore lobe and an aft lobe, the fore lobe received in the seat, and the aft lobe received in a socket formed in the moveable portion.

In a further embodiment of any of the above, the seal maintained in position by a pressure differential between a pressure side and a suction side of the airfoil.

In a further embodiment of any of the above, a spring is received in the seat, the seal resiliently retained in the direction of the moveable portion by the spring.

In a further embodiment of any of the above, the spring is one of a wave spring, a W-spring, and an X-spring.

In a further embodiment of any of the above, a spindle is included. The spindle is engaged with a socket in the moveable portion, wherein rotation of the spindle moves the moveable portion relative to the static portion.

In a further embodiment of any of the above, an end of the spindle is shaped to correspond to a shape of the socket.

In a further embodiment of any of the above, the spindle includes a bore for routing a flow of fluid into an interior of the moveable portion.

In a further embodiment of any of the above, the airfoil is a vane, the vane including an inner platform, an outer platform, and an airfoil section between the inner platform and the outer platform.

In a further embodiment of any of the above, the moveable portion includes a tab projecting into a slot formed in one of the inner platform and the outer platform to restrict movement of the moveable portion.

Another exemplary embodiment of this disclosure relates to a gas turbine engine. The engine includes a compressor section, a combustor section, and a turbine section. A vane is provided in one of the compressor section and the turbine section. The vane includes a static portion, a moveable portion, and a seal between the static portion and the moveable portion. The seal is moveable separate from the static portion and the moveable portion.

In a further embodiment of any of the above, the seal is retained against the moveable portion.

In a further embodiment of any of the above, the seal is retained in the direction of the moveable portion at least partially by a fluid.

In a further embodiment of any of the above, the seal is resiliently retained in the direction of the moveable portion at least partially by a spring.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
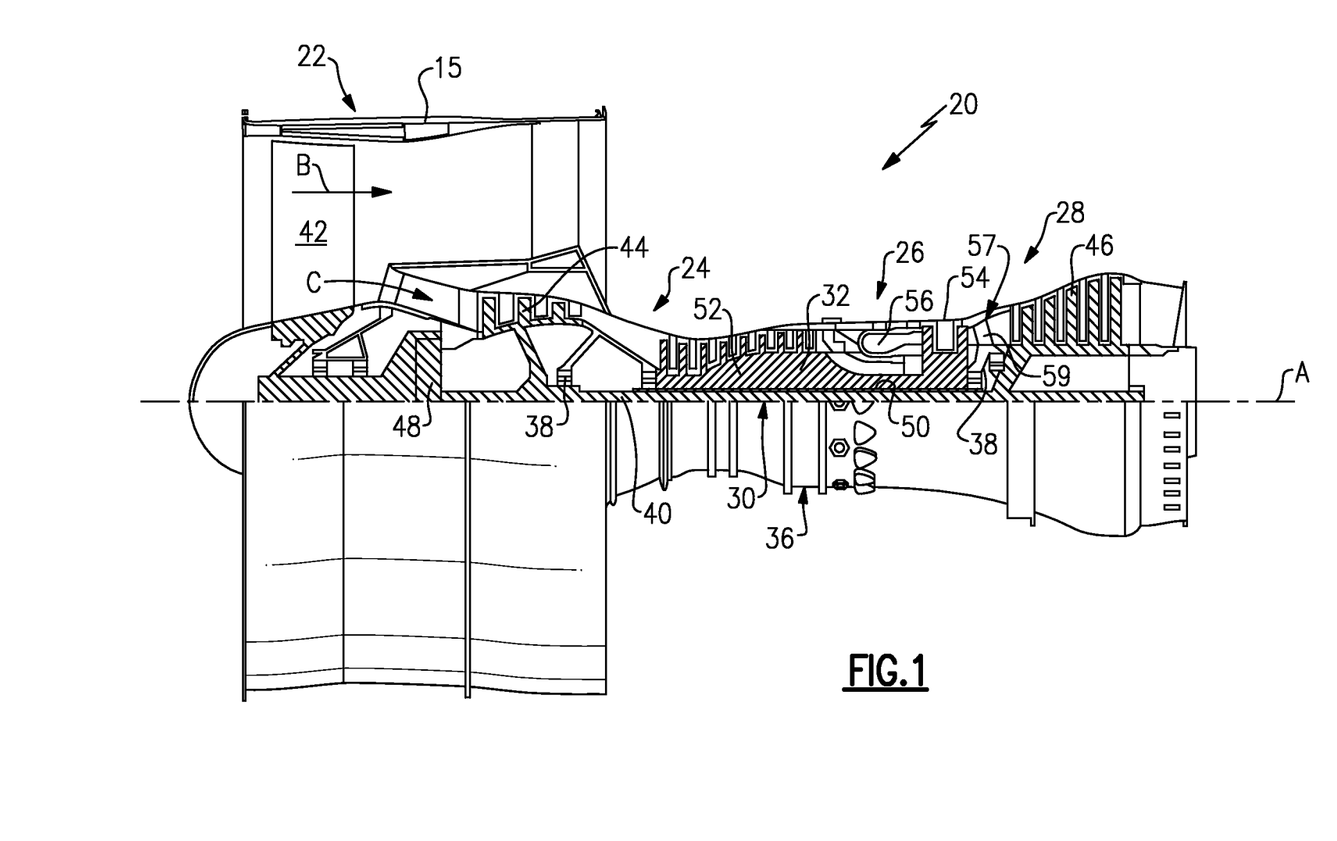
FIG. 1 schematically illustrates a gas turbine engine

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
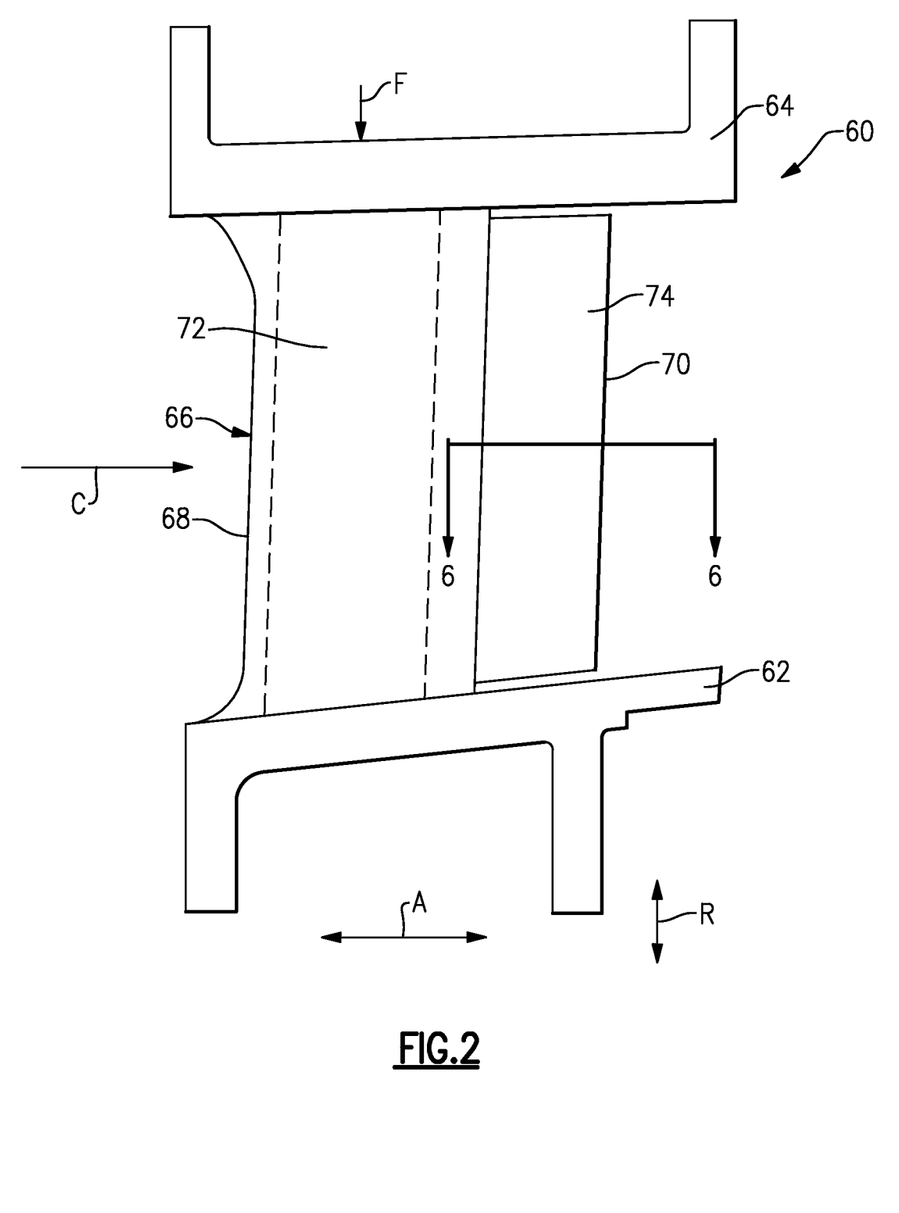
FIG. 2 illustrates an example airfoil assembly.

FIG. 2 illustrates an example airfoil assembly according to this disclosure. In this example, the airfoil assembly is a vane 60 for either the compressor section 24 or the turbine section 28 of the engine, although this disclosure could extend to inlet guide vanes and other airfoil structures. The vane 60 may be particularly beneficial when used in the turbine section 28 to provide a variable area turbine section. While vanes, such as the vane 60, are often referred to as "stator vanes," the vane 60 described herein includes both a static (or, non-moveable) portion and a moveable portion, as will be discussed in detail below.

The vane 60 in this example includes an inner platform 62, an outer platform 64, and an airfoil section 66 extending in a radial direction R, which is generally normal to the engine central longitudinal axis A. The airfoil section 66 includes a leading edge 68 and a trailing edge 70, a static portion 72, and a moveable portion, or flap, 74. In this example, the moveable portion 74 is arranged generally downstream of the static portion 72, relative to the core airflow path C. The static and moveable portions 72, 74 may be made of high temperature cobalt and nickel based alloys, along with non-metallics such as ceramic matrix composite (CMC) materials, monolithic ceramics, or refractory metal alloys. These materials may be used in different combinations between the static and moveable portions 72, 74. One combination that may be particularly beneficial is a metallic static portion 72, and a non-metallic moveable portion 74.

The engine 20 may include an array having a plurality of the vanes 60 arranged circumferentially adjacent one another. Coordinated movement of the moveable portions 74 changes the effective area of the core airflow path C.

Figures 3, 5A:
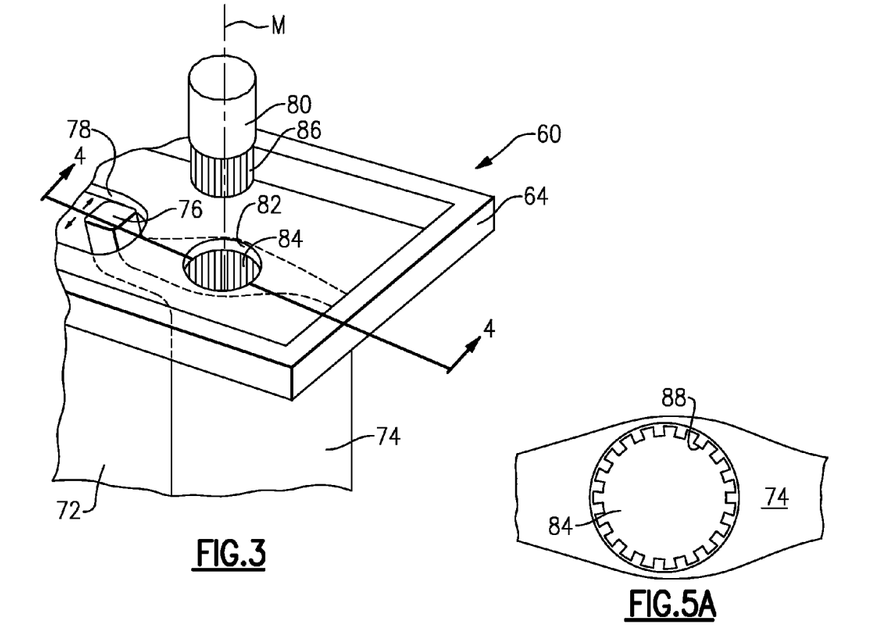
FIG. 3 is a perspective, radially outer view of the airfoil assembly of FIG. 2.
FIGS. 5A-5C illustrate example sockets for the moveable portion of the airfoil assembly.
Figure 4:
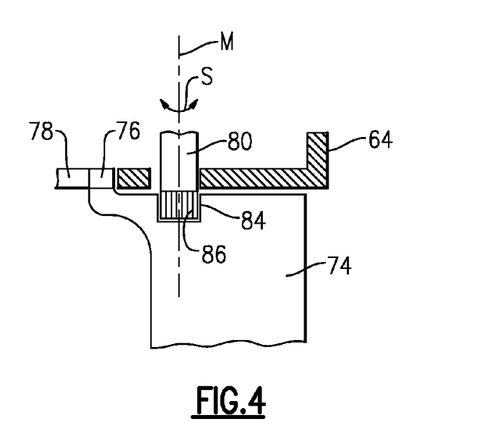
FIG. 4 is a cross-sectional view taken along line 4-4 in FIG. 2.

FIG. 3 is a perspective, radially outer view of the vane 60. In this example, the moveable portion 74 includes a tab 76 projecting radially outward, and in a fore direction (perhaps best seen in FIG. 4), into a slot 78 formed in the outer platform 64. The slot 78 restricts movement of the tab 76, which in turn restricts movement of the moveable portion 74.

A rotatable spindle 80 is, in one example, operable to actuate the moveable portion 74. In the example, the spindle 80 is provided through an orifice 82 in the outer platform 64, and is received in a socket 84 formed in the moveable portion 74. The spindle 80 and the socket 84 are arranged about an axis M, and are configured to rotate about the axis M in the direction S.

Figure 5B:
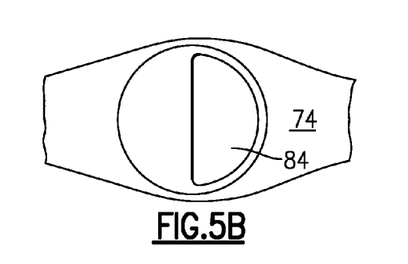
Figure 5C:
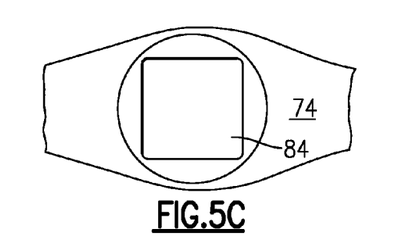

An end of the spindle 80 may be provided with a spline 86 corresponding to a spline 88 of the socket 84 (FIG. 5A). It should further be understood that engagement features other than the splines 86, 88 may be used between the spindle 80 and the socket 84. For instance, as illustrated in FIG. 5B, the socket 84 has a half-moon shape. In this example, the end of the spindle 80 would have a corresponding half-moon shape for receipt in the socket 84. An alternate arrangement is illustrated in FIG. 5C, wherein the socket 84 is generally square in cross-section. In this example, the end of the spindle 80 would be provided with a corresponding, generally square cross-sectional shape. Other socket 84 and spindle 86 engagement features come within the scope of this disclosure.

The moveable portion 74 may optionally include a tab similar to the tab 76 adjacent the inner platform 62. That tab would be provided in a corresponding slot formed in the inner platform 62. Similarly, another rotatable spindle and socket may be provided adjacent the inner platform. In this example, movement of the additional spindle may be coordinated with the spindle 80. The spindle 80 may be driven by any type of drive arrangement. In the example where the engine 20 includes a plurality of adjacent vanes 60, the drive arrangements for each vane can be linked to coordinate movement between the various moveable portions 74.

Figure 6:
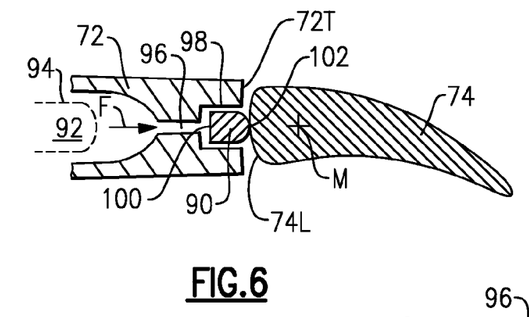
FIG. 6 is a cross-sectional view taken along line 6-6 in FIG. 2, and illustrates a first seal arrangement.

The interface between the moveable portions 74 and the respective static portions 72 may provide a leak path for the core airflow through the vanes 60 between the pressure and suction sides. In further examples, a seal is provided between the static portion 72 and the moveable portion 74 to reduce leakage. FIG. 6 is a sectional view taken along line 6-6 from FIG. 2, and illustrates an example seal 90 provided at the interface between a trailing edge 72T of the static portion 72 and a leading surface 74L of the moveable portion 74.

The seal 90 is formed separately from, and is a separate structure from, the static portion 72 and the moveable portion 74. In other words, the seal 90 is moveable separate from (or, independently from) the static portion 72 and the moveable portion 74. The seal 90 may be formed of an appropriate material suitable for exposure to high temperatures. Example materials include alloys, such as cobalt and nickel based alloys, including but not limited to Inconel X-750, Haynes® 188, Mar-M-509, Haynes® 230, Hastelloy® X, or non-metallics such as CMC and monolithic ceramic materials. Further, wear resistant coatings may be applied to either the seal 90, or the leading surface 74L.

In this example, the static portion 72 includes a flow path 92 extending radially (in the radial direction R) between the inner platform 62 and the outer platform 64. In other examples, there is no flow path 92. A flow of fluid F may pass through the passageway 92, and can serve to cool the airfoil section 66 of the vane 60, or be used for other purposes remote from the vane 60. A baffle 94 (shown in phantom) may optionally be provided in the passageway 92 for directing the fluid F in a desired manner. The baffle 94, if present, may also axially restrict movement of the moveable portion 74 in some examples (by being arranged to abut a leading surface 74L of the moveable portion or the tab 76).

In this example, the static portion 72 includes an axially-extending passageway 96 leading to a seat 98. The seat 98 at least partially receives the seal 90. In this example, the seat 98 and the seal 90 are radially elongated, in the radial direction R, along substantially the entire length of the airfoil section 66. In some examples, the static portion 72 includes grooves adjacent the seat 98 for evenly distributing air around the seal 90. The static portion 72 may also include drilled or cast-in passages for directing air around the seal 90. In this example, the seal 90 includes a fore surface 100, which is substantially planar and arranged substantially normal a length of the passage 96. The seal 90 then includes an aft surface 102, which is convex, and abuts the leading surface 74L of the moveable portion 74, which is also convex in this example. The pressure from the fluid F flowing through the passageway 96 and against the fore surface 100 retains, or urges, the seal 90 against the leading surface 74L. The fluid F also cools the seal 90 and the interface between the moveable portion 74 and the static portion 72, to purge leakage flow into the flow path 92, as needed. One possible design consideration is that the force exerted on the seal 90 by the pressure from the fluid F must be higher than the pressure differential between the pressure side and suction side of the vane 60 for the seal 90 to remain in the illustrated position. The engagement between these convex surfaces 74L, 102 creates an effective seal, while allowing movement between the moveable portion 74 and the static portion 72.

Figure 7:
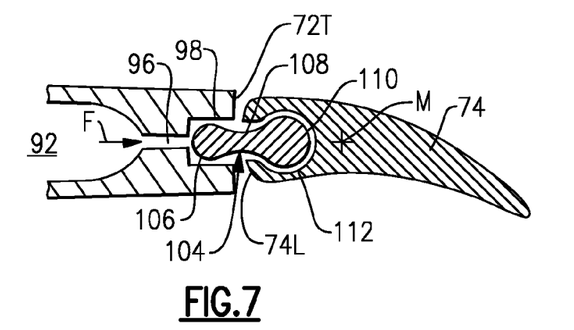
FIG. 7 illustrates a second seal arrangement.

Another example seal arrangement is illustrated in FIG. 7. In this example, a "dog bone" seal 104 is illustrated. The seal 104 includes a fore lobe 106, a narrow connecting portion 108, and an aft lobe 110. In this example, the fore lobe 106 is provided in the seat 98, and the aft lobe 110 is provided in a corresponding socket 112 formed in the leading surface 74L of the moveable portion 74. The aft lobe 110 and the socket 112 have cooperating geometric size and shape that allow a desired range of motion of the moveable portion 74. Like the FIG. 6 example, the seal 104 is retained in the direction of the socket 112 by way of the pressure from the fluid F, but in this example the seal 104 is also maintained in position by way of the pressure differential between a pressure side and a suction side of the vane 60. The seal 104 provides an effective resistance to leakage between the static and moveable portions 72, 74.

Figure 8A:
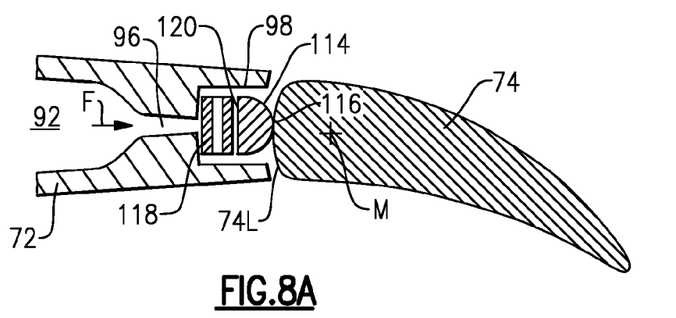
FIG. 8A illustrates a third seal arrangement including a first spring.
Figure 8B:
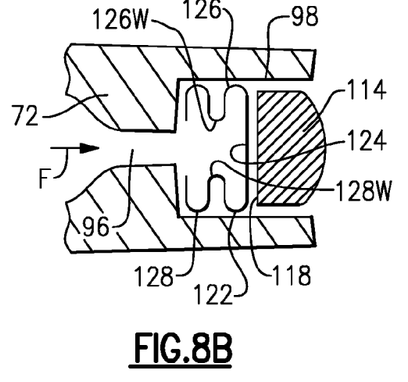
FIG. 8B illustrates a fourth seal arrangement including a second spring.
Figure 8C:
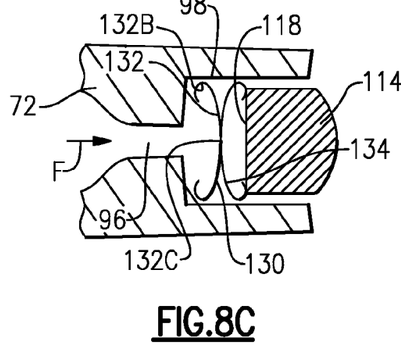
FIG. 8C illustrates a fifth seal arrangement including a third spring.

FIGS. 8A-8C illustrate alternate sealing arrangements including an elastic member, or spring. A seal 114 is similar to the seal 90 of FIG. 6, and is arranged in the seat 98. The seal 114 includes a convex surface 116 abutting a convex leading surface 74L of the moveable portion 74. The FIG. 8A arrangement further includes a spring 118 in the seat 98 and abutting a fore surface 120 of the seal 114. In one example, the spring 118 is a wave spring. The spring 118 resiliently retains, or urges, the seal 114 toward the fore surface 120.

While a wave spring is illustrated in FIG. 8A, other spring types come within the scope of this disclosure. For example, FIG. 8B illustrates an alternate type of spring, a W-spring 122. The W-spring 122 includes a main-body portion 124 and two opposed arms 126, 128. The arms 126, 128 in this example each include a wave 126W, 128W, and are arranged such that the W-spring 122 is open toward the passage 96. In this way, the fluid F is essentially captured between the arms 126, 128 to retain the W-spring against the seal 114.

Another spring type is illustrated in FIG. 8C. FIG. 8C illustrates an X-spring 130, which includes opposed first and second arms 132, 134. The first arm 132 has opposed bends 132B, and is attached to the second arm 134 at a center portion 132C. The second arm 134 is similarly arranged. As illustrated, the first arm 132 is open toward the passageway 94, and the second arm 134 is open toward the seal 114. The first arm 132 essentially captures the fluid F, and the second arm 134 abuts the seal 114 to resiliently retain the seal 114 against the moveable portion 74. While not illustrated, the springs 118, 122, and 130 could be used relative to a "dog bone" seal, such as the seal 104 in FIG. 7.

Each of the springs illustrated in FIGS. 8A-8C may provide the additional benefit of maintaining the position of seal 114, and assisting in overcoming the pressure differential between the pressure and suction sides of the vane 60. The springs 118, 122, 130 illustrated in FIGS. 8A-8C may be formed from a metallic material. Other suitable materials may be used, however. As one would appreciate, the terms W-spring and X-spring generally refer to the shape of the cross-section of the particular spring. Again, springs other than those shown in FIGS. 8A-8C come within the scope of this disclosure, including springs that are integral to the seat.

Figure 9:
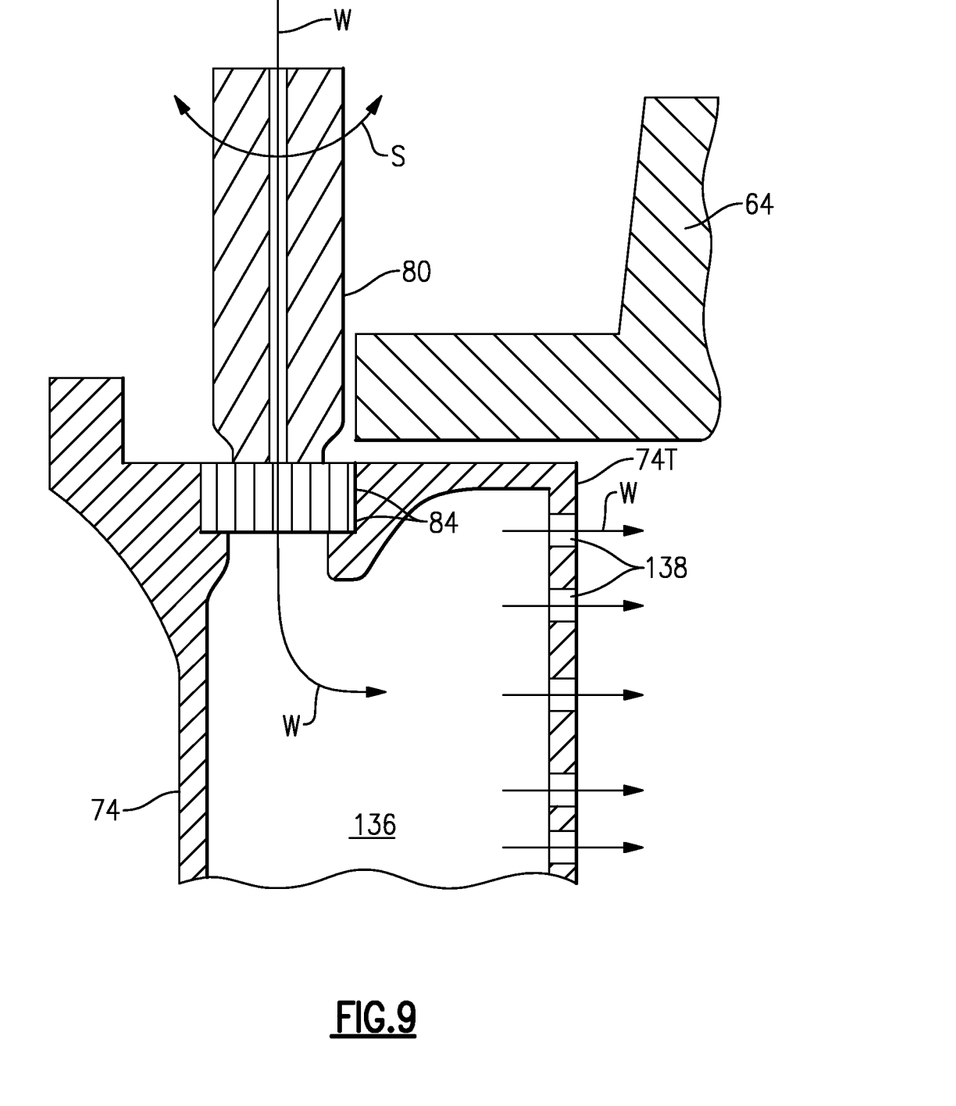
FIG. 9 is a cross-sectional view similar to FIG. 4, and illustrates the detail of an example cooling arrangement of the moveable portion.

The moveable portion 74 may be cooled, if needed, with a cooling flow of fluid, similar to how the static portion 72 can be cooled with the fluid F. As illustrated in FIG. 9, a cooling flow of fluid W may be provided from a source, such as compressor bleed air, for example. In one example, the fluid W is directed through the spindle 80, which may include a bore along its length, through the socket 84, which may include an orifice at a base thereof, and into an internal cavity 136 within the moveable portion 74. The illustrated bore may be narrower than a bore is actually machined through the spindle 80. The cooling flow W may then exit at a surface of the moveable portion 74, which may include a plurality of exit passageways 138.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A system, comprising:
an airfoil having a static portion, a moveable portion, and a seal between the static portion and the moveable portion, the seal moveable separate from the static portion and the moveable portion, wherein the static portion includes a passageway configured to direct fluid to a seat, the seal at least partially received in the seat, wherein pressure from the fluid flowing through the passageway urges the seal against a leading surface of the moveable portion.

2. The system as recited in claim 1, wherein the seal is retained against the moveable portion.

3. The system as recited in claim 2, wherein the seal is resiliently retained against the moveable portion at least partially by a spring.

4. The system as recited in claim 1, wherein the seal includes a fore surface and an aft surface, the aft surface being convex.

5. The system as recited in claim 4, wherein the aft surface abuts a leading surface of the moveable portion, the leading surface being convex.

6. The system as recited in claim 1, wherein the seal includes a fore lobe and an aft lobe, the fore lobe received in the seat, and the aft lobe received in a socket formed in the moveable portion.

7. The system as recited in claim 6, wherein the seal is maintained in position by a pressure differential between a pressure side and a suction side of the airfoil.

8. A system, comprising:
an airfoil having a static portion, a moveable portion, and a seal between the static portion and the moveable portion, the seal moveable separate from the static portion and the moveable portion, wherein the static portion includes a seat, the seal at least partially received in the seat; and
a spring is received in the seat, the seal resiliently retained in the direction of the moveable portion by the spring.

9. The system as recited in claim 8, wherein the spring is one of a wave spring, a W-spring, and an X-spring.

10. The system as recited in claim 1, including a spindle, the spindle engaged with a socket in the moveable portion, wherein rotation of the spindle moves the moveable portion relative to the static portion.

11. The system as recited in claim 10, wherein an end of the spindle is shaped to correspond to a shape of the socket.

12. The system as recited in claim 10, wherein the spindle includes a bore for routing a flow of fluid into an interior of the moveable portion.

13. The system as recited in claim 1, wherein the airfoil is a vane, the vane including an inner platform, an outer platform, and an airfoil section between the inner platform and the outer platform.

14. The system as recited in claim 13, wherein the moveable portion includes a tab projecting into a slot formed in one of the inner platform and the outer platform to restrict movement of the moveable portion.

15. A gas turbine engine, comprising:
a compressor section, a combustor section, and a turbine section;
a vane provided in one of the compressor section and the turbine section, the vane including a static portion, a moveable portion, and a seal between the static portion and the moveable portion, the seal moveable separate from the static portion and the moveable portion wherein the static portion includes a passageway configured to direct a fluid to a seat, the seal at least partially received in the seat, and wherein the seal is resiliently retained in the direction of the moveable portion at least partially by a spring.

16. The engine as recited in claim 15, wherein the seal is retained against the moveable portion.

17. The system as recited in claim 1, wherein the static portion includes a radial flow path configured to direct fluid in a radial direction within the static portion, and wherein the passageway is axially-extending and is arranged such that fluid from the radial flow path enters the passageway and flow toward the seal.

18. The engine as recited in claim 15, wherein the static portion includes a radial flow path configured to direct fluid in a radial direction within the static portion, and wherein the passageway is axially-extending and is arranged such that fluid from the radial flow path enters the passageway and flow toward the seal.

* * * * *